(12) United States Patent
Guimbard et al.

(10) Patent No.: US 8,011,879 B2
(45) Date of Patent: Sep. 6, 2011

(54) TRANSITION CHANNEL BETWEEN TWO TURBINE STAGES

(75) Inventors: Jean-Michel Guimbard, Cely en Biere (FR); Philippe Jean-Pierre Pabion, Vaux le Penil (FR); Eric Schwartz, Seine Port (FR); Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 809 days.

(21) Appl. No.: 11/868,189

(22) Filed: Oct. 5, 2007

(65) Prior Publication Data

US 2008/0085182 A1  Apr. 10, 2008

(30) Foreign Application Priority Data

Oct. 6, 2006  (FR) ..................................... 06 54139

(51) Int. Cl.
*F01D 5/08* (2006.01)
(52) U.S. Cl. ........ 415/108; 415/115; 415/135; 415/138; 415/139; 415/213.1
(58) Field of Classification Search .................. 415/108, 415/115, 134, 135, 136, 138, 139, 213.1
See application file for complete search history.

(56) References Cited

U.S. PATENT DOCUMENTS

| 4,214,851 | A | * | 7/1980 | Tuley et al. ................... 415/115 |
| 5,100,291 | A | * | 3/1992 | Glover ......................... 415/115 |
| 6,227,798 | B1 | * | 5/2001 | Demers et al. ............... 415/115 |
| 2003/0002975 | A1 | | 1/2003 | Dudebout et al. |
| 2005/0279100 | A1 | | 12/2005 | Graziosi et al. |

FOREIGN PATENT DOCUMENTS

| FR | 2 423 638 | 11/1979 |
| GB | 1 386 281 | 3/1975 |

* cited by examiner

*Primary Examiner* — Igor Kershteyn
(74) *Attorney, Agent, or Firm* — Oblon, Spivak, McClelland, Maier & Neustadt, L.L.P.

(57) ABSTRACT

A transition channel between a first turbine section and a second turbine section for a gas turbine engine is disclosed. The channel includes a first radially external annular wall including ring sector elements housed inside an annular ring and orifices for injecting a fluid into the channel in order to re-energize the boundary layer thereof, a second radially internal annular wall, and a fluid supply device arranged between the space outside the ring and the injection orifices.

12 Claims, 3 Drawing Sheets

TRANSITION CHANNEL BETWEEN TWO TURBINE STAGES

The present invention relates to the field of gas turbine engines and is aimed in particular at a transition channel between two turbine stages.

BACKGROUND OF THE INVENTION

A multiple-bodied gas turbine engine comprises assemblies rotating independently of one another usually about one and the same axis. For example, a double-bodied engine comprises two assemblies, one called high pressure and the other low pressure. The high pressure body consists of a compressor and a turbine mounted on one and the same shaft. The high pressure compressor supplies the combustion chamber with air which itself delivers the combustion gases to the high pressure turbine. The low pressure body comprises a low pressure turbine receiving, through a channel called the transition channel and where necessary a distributor, the gases that have undergone a first expansion in the high pressure turbine.

One of the means of increasing the output of the low pressure turbine consists in reducing the aerodynamic load via an increase in the average radius of the latter. The radius of the high pressure turbine remaining unchanged, it follows that the geometry of the transition channel between the high pressure, HP, turbine and the low pressure BP, turbine is therefore to be adapted between its section for the inlet of the gases originating from the high pressure turbine and its outlet section emerging into the distributor for supplying the low pressure turbine. For aero engines, because of space and weight constraints, it is not opportune to lengthen the transition channel; it follows that the walls of the latter must have steep slopes and arrange a considerable diffusion. A limit is however imposed by the quality of flow that is to be retained at the walls; the thickening and even the detachment of the boundary layer must be avoided.

If the limits of slope and diffusion in the swan neck formed by the transition channel are exceeded, detachments of the boundary layer occur that are an unfavorable factor for the performance of the turbine. That would cancel out the gain provided by the increase in the average radius of the low pressure turbine.

To remedy this problem, a solution consists in re-energizing the boundary layer at the walls in order to prevent detachments of the boundary layer, by injecting a flow of fluid into the boundary layer.

Such a solution therefore allows the adoption of a transition channel from the HP turbine to the BP turbine:
  with a steep slope in order to increase the average radius of the turbine and hence the output,
  with high diffusion in order to reduce the losses generated by the distributor of the low pressure turbine and hence increase the output of the BP turbine.

This solution is appropriate for any transition channel between two turbine sections, not only between the HP section and the BP section immediately downstream.

DESCRIPTION OF THE PRIOR ART

Patent application US2005/0279100 describes such an inter-turbine transition channel provided with a fluid blowing means. A gas bleed duct is arranged in the stream upstream of the high pressure turbine. This duct bypasses the high pressure turbine and emerges downstream of the latter substantially parallel with the external wall of the transition channel, in the zone where the detachment of the boundary layer is likely to occur. As is mentioned in this document, the injection of fluid allows the production of a channel whose external wall has a steep slope.

Because of the thermal and mechanical stresses, there are however difficulties in injecting fluid into the transition channel.

SUMMARY OF THE INVENTION

The subject of the present invention is a method for producing the structure of the transition channel allowing an effective injection of the fluid for reattaching the boundary layer.

According to the invention, the transition channel between a first turbine section and a second turbine section for a gas turbine engine, comprising a first radially external annular wall, a second radially internal annular wall, the first wall comprising orifices, in the form of slots, holes or other elements, for injecting a fluid into the channel in order to re-energize its boundary layer, is characterized in that the first wall consists of ring sector elements housed inside an annular ring, fluid supply means being arranged between the outside of the ring and said injection orifices.

According to a first embodiment, the supply means comprise openings arranged in the annular ring, cavities arranged in the ring sectors and communicating with the injection orifices, and connecting tubes fitted between said openings and said cavities.

According to another embodiment, the supply means comprise openings arranged in the annular ring, cavities arranged in the ring sectors and communicating with the injection orifices, and an annular channel, delimited by annular seals, arranged between the openings and the cavities and placing them in communication.

According to another embodiment, the fluid injection orifices in the ring sector elements are obtained by machining the ring sectors.

According to another embodiment, the fluid injection orifices are defined between openings machined in the sectors and guide elements fitted to the sectors.

Advantageously, according to a particular embodiment, the injection orifices are arranged in order to impart a tangential speed component to the fluid.

The invention also relates to a gas turbine engine comprising a first turbine section and a second turbine section connected via a transition channel, wherein the ring arranges a fluid distribution cavity with a turbine casing element, said casing element comprising a fluid supply orifice communicating with a bleed zone upstream of the transition channel. The bleed is carried out preferably at the compressor so that the injected air forms a film for protecting the wall.

More particularly, the ring sectors, forming the radially external annular wall of the transition channel, are fitted to the elements forming the distributor at the entrance to the second turbine section. According to one embodiment, the ring sectors form monobloc parts with the elements of the distributor.

BRIEF DESCRIPTION OF THE DRAWINGS

The invention will now be described in more detail with reference to the appended drawings in which.

DESCRIPTION OF THE PREFERRED EMBODIMENTS

Figure 1:
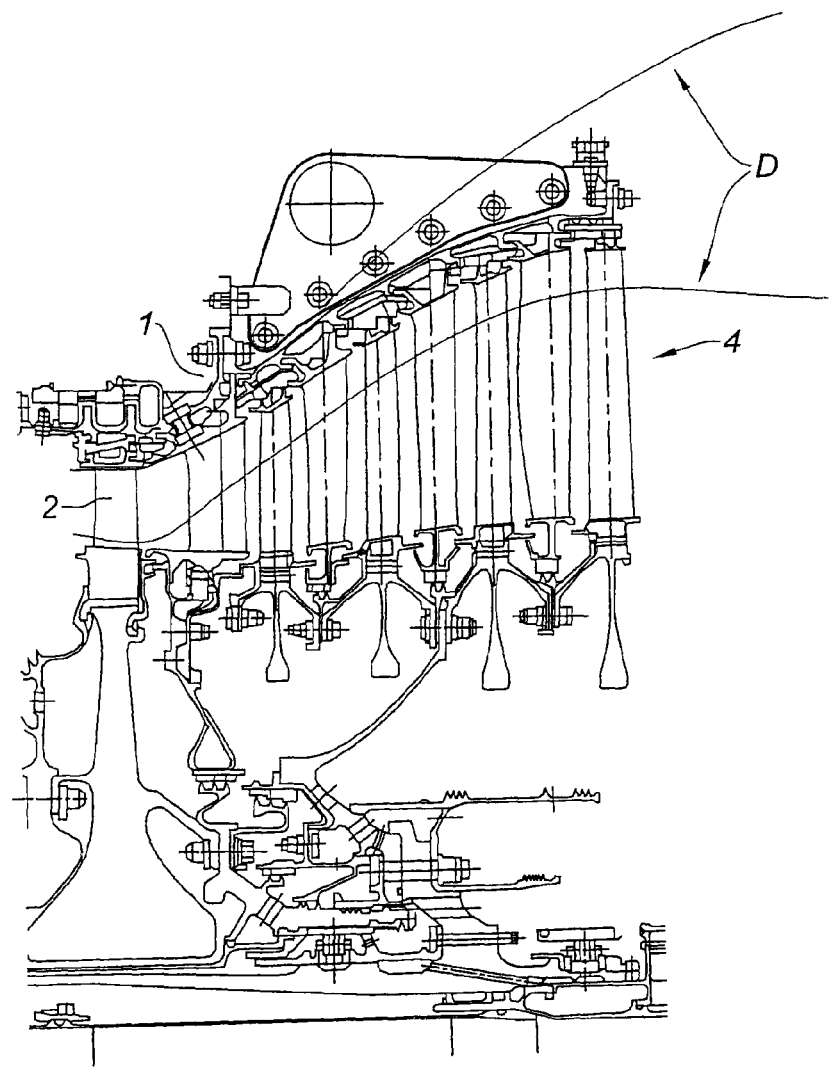
FIG. 1 shows in axial half-section the turbine section of a gas turbine engine of the prior art with a first turbine, a second turbine and a transition channel.

FIG. 1 shows an exemplary architecture of the prior art of the turbine sections of a gas turbine engine. The casing 1 houses a first turbine rotor 2. Here, it is the high pressure turbine of the engine. This turbine is fixedly attached to a first shaft. A second turbine 4, here the low pressure turbine, receives the gases having undergone a first expansion in the turbine 2. The expansion is split between several stages, mounted on a single rotor. The latter is fixedly attached to a shaft coaxial with the first and independent of the latter. A transition channel 6 is arranged between the two sections, more precisely between the rotor of the high pressure turbine and the distributor at the entrance to the low pressure turbine. Because of the expansion of the gases between the entrance to the high pressure stage and the exit from the low pressure section, the volume increases and the average diameter also. However, this increase remains compatible with the conditions of undisturbed flow.

In the context of the design studies to increase the output of the low pressure turbine, the profile of the aerodynamic channel is optimized. Amongst these optimizations, the increase in the slope at the entrance to the low pressure turbine is adopted in the transition channel which allows a rapid increase in the average radius of the low pressure turbine. In addition, this increase in section at the entrance to the low pressure distributor generated by a greater diffusion in the channel, generates an increase in performance on the first stage with a better acceleration in the distributor. Thin lines (D) in FIG. 1 show the contours of such an optimized profile.

However, a steep slope at the entrance to the low pressure turbine creates risks of detachments of the boundary layer along the external wall of the main flow originating from the high pressure turbine. These detachments greatly harm the performance of the BP turbine.

In the proposed solution, a significant gas flow is injected at the exit from the high pressure turbine at the wall in order to keep it at the wall. This injection of air is commonly called blowing.

Figure 2:
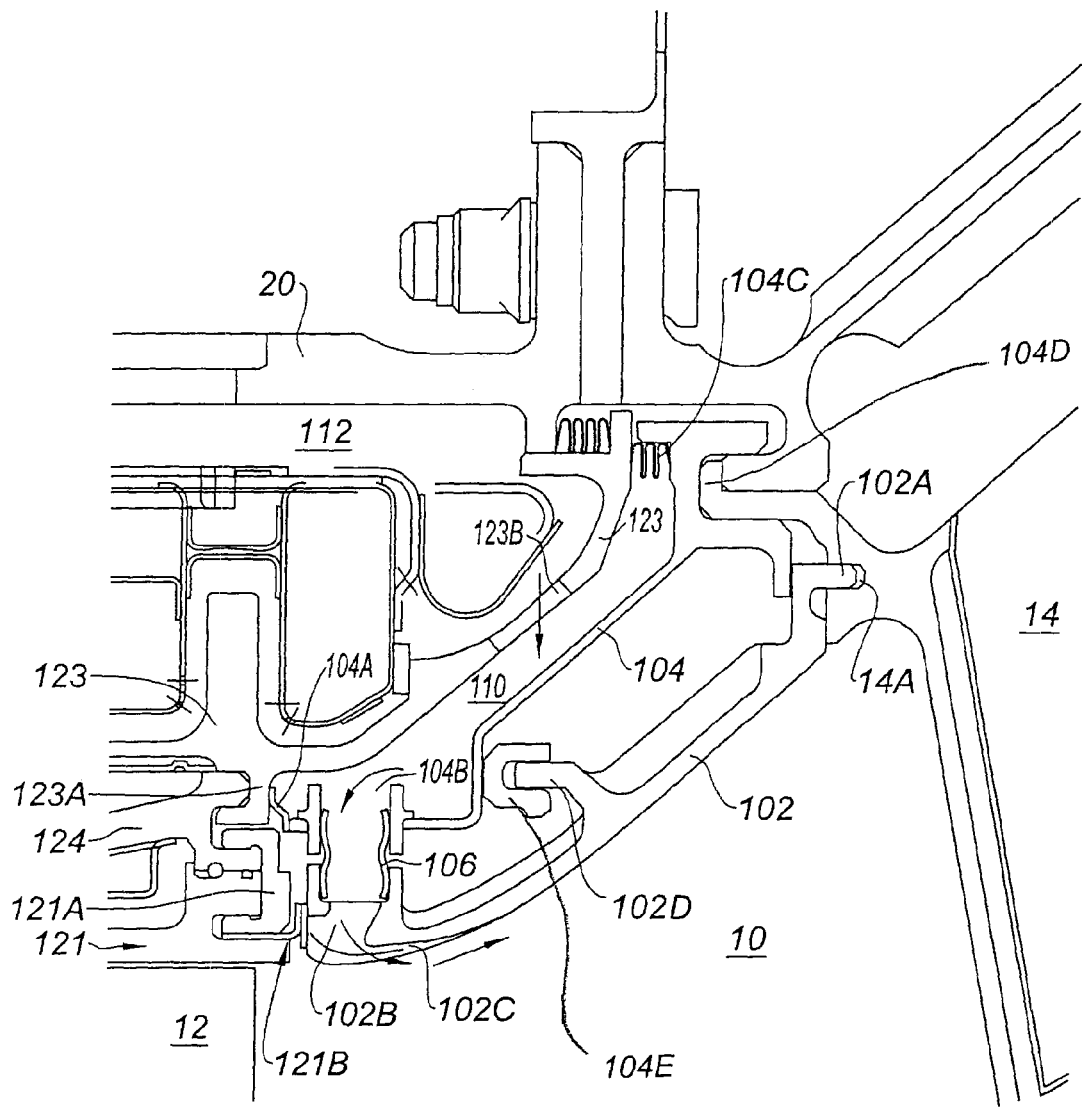
FIG. 2 is a partial view of the radially external portion of the transition channel and shows the arrangement according to a first embodiment of the invention.

FIG. 2 shows the technological integration of the blowing that is the subject of the invention in an engine environment example. The figure shows a portion, in axial section, of the transition channel 10. This channel 10 is situated between the HP turbine 12 of which a portion of blade can be seen and the distributor 14 at the entrance to the BP turbine section of which a portion of blade is also seen. The blading of the HP turbine 12 can move inside an annular channel defined externally relative to the axis of the engine by a sealing ring 121. This ring is attached in an internal casing element 123, called the HP turbine casing. This casing is itself mounted in the external casing 20. The turbine ring 121 is formed of a plurality of annular sectors and is held in the casing element 123 by means of an intermediate part 124 by means of clamps 121A.

The annular transition channel 10 is defined between a first radially external wall 102 and a second radially internal wall not shown in FIG. 2. The first wall 102 is formed of platforms in ring sectors extending axially between the HP turbine ring 121 and the distributor 14 of the first stage of the BP turbine.

In axial section, as is seen in FIG. 2, downstream, the first wall 102 is fixedly attached to the distributor 14 by a tongue connection 102A in a groove 14A. Upstream, the first wall 102 is pressing against the sealing ring 121 via a seal 121B. Cavities 102B are arranged upstream of the wall. These cavities 102B are radially open outward, relative to the axis of the machine. They communicate with injection orifices 102C that open into the transition channel 10. The injection orifices 102C are oriented substantially parallel to the surface of the wall 102. To the extent that the gas stream originating from the HP turbine comprises a tangential component in the transverse plane relative to the axis of the engine, it is advantageous to give these orifices an orientation that is also tangential in the transverse plane.

The wall 102 is contained in an annular ring 104 of the same axis as that of the channel, of substantially frustoconical shape. This ring 104, made particularly of metal sheet, extends axially between the sealing ring 121 and the distributor. More precisely, upstream, the ring presses via a seal 104A against a radial flange 123A of the HP turbine casing 123 that is close to the edge of the ring 121 or, as here, in the same transverse plane as the latter. Downstream, the ring 104 is held by a tongue and groove fastener 104D fixedly attached to the HP casing 123. An axial flange 102D forms a bearing surface 104E for the ring 104.

The ring 104 comprises radial openings 104B communicating with the cavities 102B of the first wall by means of fitted connecting tubes 106. These cylindrical tubes have, at their ends, surfaces with an axial section in the arc of a circle interacting with the walls of the openings 104B on the one hand and of the cavities 102B. The diameters are adjusted so as to form a sealed contact between the tubes and the cylindrical walls of the openings 104B and the cavities 102B. The gaseous fluid is guided through the connecting tube with no leak. A limited rotary movement of the tubes in their housings is therefore allowed so as not to immobilize the first wall relative to the ring.

The ring 104 arranges an annular space 110 with the wall of the turbine casing 123 downstream of the radial flange 123A. A seal 104C provides the seal downstream between the ring 104 and the wall 123 of the casing. Orifices 123B arranged in the wall of the turbine casing 123 place the space 110 in communication with a fluid supply channel 112. Thus the annular space 110 is delimited between the ring 104, the casing 123 and the seals 104A and 104C.

When the engine is operating, the gaseous fluid is guided from the channel 112 into the space 110 through the orifices 123B, then from the space 110 into the cavities 102B of the first wall of the channel 102 from where it is injected into the channel 10 through the injection orifices 102C in order to re-energize the boundary layer on the wall 102.

The channel 112 communicates with a zone that is situated upstream of the HP turbine and that is at a higher pressure than exists in the transition channel 10. By choosing to bleed the fluid at the compressor for example, it is possible to perform an additional function of thermal protection of the wall.

Figure 3:
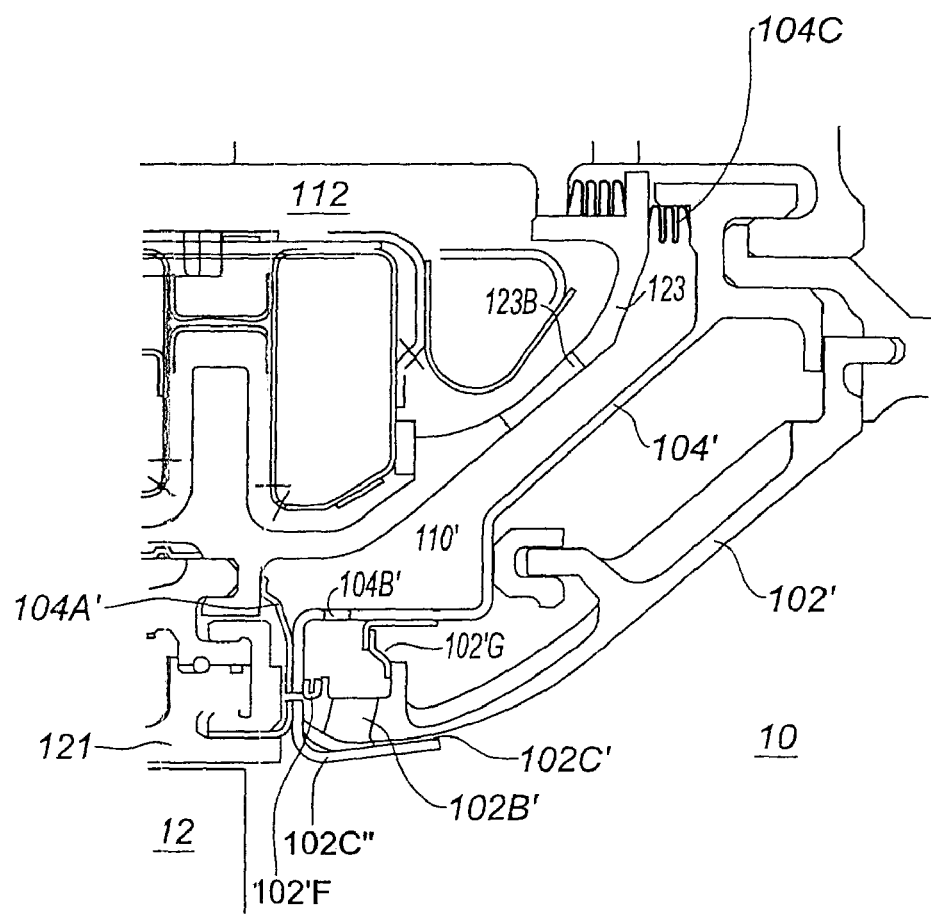
FIG. 3 shows a partial view of the radially external portion of the transition channel with an arrangement according to another embodiment.

A variant embodiment is described with reference to FIG. 3. The portions that have been simply modified relative to the description with reference to FIG. 2 carry the same reference number but with a prime. In this embodiment, the connecting tubes are replaced by a duct arranged via seals.

The space 110' is defined between the turbine casing element 123, the ring 104' and two seals, one upstream 104' and the other downstream 104C. The ring 104' is pierced, upstream, with orifices 104B' communicating with radial cavities 102B' arranged in the first wall 102'. Seals 102'F and 102'G ensure a gaseous flow between the openings 104B' and the cavities 102B' with no leak. The seal 102'F here is ring-shaped; it is housed between the ring and a radial flange arranged on the ring sector forming the first wall. The seal 102'G is in the form of metal sheet fixedly attached to the ring 104' and pressing elastically against a radial flange of the ring sector forming the wall 102'.

The cavities 102B' communicate with the injection orifices 102C' in the channel 10; according to this embodiment, the orifices 102C' are arranged by a guide 102C" fitted to the first wall. The cavities 102B' are through-cavities and are partially closed by the guide 102". As in the preceding embodiment, the injection orifices are advantageously oriented with a tangential component in the plane transversal to the axis of the engine.

Operation is the same as in the preceding case.

The solution of the invention makes it possible via the ring to isolate the ring sectors forming the first wall from the source of fluid constituted by the channel 112, and to provide effective guidance to the injection orifices without loss of fluid.

The invention claimed is:

1. A transition channel between a first turbine section and a second turbine section for a gas turbine engine, comprising:
    a first radially external annular wall including ring sector elements housed inside an annular ring and orifices which inject a fluid into the channel in order to re-energize a boundary layer of the channel;
    a second radially internal annular wall; and
    a fluid supply device arranged between a space outside the ring and said injection orifices,
    wherein an upstream end of the ring presses against a flange of a casing of the first turbine section via a seal and a downstream end of the ring is held by a tongue and groove fastener attached to the casing of the first turbine section, and
    wherein the first wall includes an axial flange which cooperates with a groove in a bearing surface disposed on the ring between the upstream end and the downstream end of the ring.

2. The transition channel as claimed in claim 1, wherein the supply device includes openings arranged in the annular ring, cavities arranged in the ring sectors forming the first wall and communicating with the injection orifices, and an annular channel, delimited by annular seals, arranged between the openings and the cavities and placing them in communication.

3. The transition channel as claimed in claim 1, wherein the orifices for injecting fluid into the ring sector elements are obtained by machining the ring sectors.

4. The transition channel as claimed in claim 1, wherein the fluid injection orifices are defined between openings machined in the ring sectors forming the first wall and guide elements fitted to said sectors.

5. The transition channel as claimed in claim 1, wherein the injection orifices are arranged in order to impart a tangential speed component, in the plane transversal to the axis of the engine, to the fluid.

6. A gas turbine engine comprising:
    a first turbine section and a second turbine section connected by a transition channel as claimed in claim 1,
    wherein the ring arranges a fluid distribution cavity with a turbine casing element, said casing element including a fluid supply orifice communicating with a bleed zone upstream of the transition channel.

7. The gas turbine engine as claimed in claim 6, wherein said bleed zone upstream of the transition channel is carried out at a compressor of the engine, and bled air from the bleed zone forms a cold film protecting the first wall.

8. The gas turbine engine as claimed in claim 7 wherein the ring sectors, forming the first radially external annular wall of the transition channel, are fitted to elements forming a distributor at an entrance to the second turbine section.

9. The gas turbine engine as claimed in claim 8, wherein said ring sectors forming the first wall constitute monobloc parts with the elements of the distributor.

10. The transition channel as claimed in claim 1, wherein a downstream end of the first wall includes a tongue connection which abuts a groove disposed in a distributor of the second turbine section.

11. The transition channel as claimed in claim 1, wherein an upstream end of the first wall presses against a sealing ring via a seal.

12. A transition channel between a first turbine section and a second turbine section for a gas turbine engine, comprising:
    a first radially external annular wall including ring sector elements housed inside an annular ring and orifices which inject a fluid into the channel in order to re-energize a boundary layer of the channel;
    a second radially internal annular wall; and
    a fluid supply device arranged between a space outside the ring and said injection orifices,
    wherein the supply device includes openings arranged in the annular ring, cavities arranged in the ring sectors forming the first wall and communicating with the injection orifices, and connecting tubes fitted between said openings and said cavities.

* * * * *

UNITED STATES PATENT AND TRADEMARK OFFICE
CERTIFICATE OF CORRECTION

| | | |
|---|---|---|
| PATENT NO. | : 8,011,879 B2 | Page 1 of 1 |
| APPLICATION NO. | : 11/868189 | |
| DATED | : September 6, 2011 | |
| INVENTOR(S) | : Jean-Michel Bernard Guimbard et al. | |

It is certified that error appears in the above-identified patent and that said Letters Patent is hereby corrected as shown below:

Title page, (75) Inventors, change "Jean-Michel Guimbard" to --Jean-Michel Bernard Guimbard--.

Signed and Sealed this
Twenty-second Day of November, 2011

David J. Kappos
*Director of the United States Patent and Trademark Office*